United States Patent
Gum et al.

(10) Patent No.: US 10,094,905 B2
(45) Date of Patent: Oct. 9, 2018

(54) OPPORTUNISTIC CALIBRATION OF A BAROMETER IN A MOBILE DEVICE

(71) Applicant: QUALCOMM Incorporated, San Diego, CA (US)

(72) Inventors: Arnold Jason Gum, San Diego, CA (US); Mark Leo Moeglein, Ashland, OR (US)

(73) Assignee: QUALCOMM Incorporated, San Diego, CA (US)

( * ) Notice: Subject to any disclaimer, the term of this patent is extended or adjusted under 35 U.S.C. 154(b) by 482 days.

(21) Appl. No.: 14/633,108

(22) Filed: Feb. 26, 2015

(65) Prior Publication Data

US 2015/0247917 A1 Sep. 3, 2015

Related U.S. Application Data

(60) Provisional application No. 62/120,864, filed on Feb. 25, 2015, provisional application No. 62/062,621,
(Continued)

(51) Int. Cl.
*G01C 5/06* (2006.01)
*H04W 4/46* (2018.01)
(Continued)

(52) U.S. Cl.
CPC .............. *G01S 5/0263* (2013.01); *G01C 5/06* (2013.01); *H04W 4/025* (2013.01); *H04W 4/029* (2018.02); *H04W 4/046* (2013.01)

(58) Field of Classification Search
CPC .... G01S 5/0263; G01S 5/0278; G01S 5/0247; G01S 19/09; G01S 5/0236; G01C 5/06;
(Continued)

(56) References Cited

U.S. PATENT DOCUMENTS 6,518,918 B1  2/2003 Vannucci et al.
6,522,298 B1  2/2003 Burgett et al.
(Continued)

FOREIGN PATENT DOCUMENTS

JP  2013200156 A  10/2013
WO  WO 2004003472 A1 * 1/2004  ............... G01C 5/06
(Continued)

OTHER PUBLICATIONS

Milan et al. ("Detection- and Trajectory-Level Exclusion in Multiple Object Tracking", IEEE Xplore: Oct. 3, 2013, Electronic ISBN: 978-0-7695-4989-7).*
(Continued)

*Primary Examiner* — Vladimir Magloire
*Assistant Examiner* — Nuzhat Pervin
(74) *Attorney, Agent, or Firm* — Thien T. Nguyen

(57) ABSTRACT

Disclosed are systems, methods and techniques for calibrating an altimeter of a mobile device. For example, a characterized motion of a mobile device may be used to infer an altitude of the mobile device. If it is further inferred that the mobile device is in an outdoor environment, an altitude of the mobile device may be based on application of an estimated location of the mobile device to an altitude terrain map.

24 Claims, 5 Drawing Sheets

Related U.S. Application Data filed on Oct. 10, 2014, provisional application No. 61/946,255, filed on Feb. 28, 2014.

(51) Int. Cl.

| | | |
|---|---|---|
| *G01S 5/02* | (2010.01) | |
| *H04W 4/029* | (2018.01) | |
| *H04W 4/02* | (2018.01) | |
| *H04W 4/04* | (2009.01) | |

(58) Field of Classification Search
CPC .... G01C 21/005; G01C 21/06; G01C 22/006; G01C 21/32; G01C 5/005; H04W 4/028; H04W 4/046; H04W 4/026; H04W 4/027; G01W 1/10
USPC .......................................................... 342/453
See application file for complete search history.

(56) References Cited

U.S. PATENT DOCUMENTS

| | | | | |
|---|---|---|---|---|
| 7,171,307 | B2* | 1/2007 | Matsumoto | G01W 1/10 |
| | | | | 702/3 |
| 7,263,442 | B2* | 8/2007 | Eckel | G01C 5/06 |
| | | | | 702/3 |
| 7,428,466 | B2* | 9/2008 | Makela | G01C 5/06 |
| | | | | 702/138 |
| 7,751,949 | B2* | 7/2010 | Alanen | G01C 5/06 |
| | | | | 342/357.2 |
| 8,566,032 | B2* | 10/2013 | Chowdhary | G01C 21/005 |
| | | | | 701/121 |
| 9,078,102 | B2* | 7/2015 | Edge | H04W 4/025 |
| 9,116,000 | B2* | 8/2015 | Pakzad | G01C 21/206 |
| 9,131,347 | B2* | 9/2015 | Venkatraman | H04W 4/029 |
| 9,297,881 | B2* | 3/2016 | Khosravy | G01S 5/0263 |
| 9,329,036 | B2* | 5/2016 | Garin | G01C 5/005 |
| 2005/0176441 | A1* | 8/2005 | Jurecka | G01S 19/09 |
| | | | | 455/456.1 |
| 2006/0100782 | A1 | 5/2006 | Levi et al. | |
| 2007/0218823 | A1 | 9/2007 | Wolf et al. | |
| 2010/0318293 | A1 | 12/2010 | Brush et al. | |
| 2011/0057836 | A1 | 3/2011 | Ische et al. | |
| 2012/0072110 | A1 | 3/2012 | Venkatraman | |
| 2012/0265373 | A1 | 10/2012 | Ingvalson et al. | |
| 2014/0012529 | A1 | 1/2014 | Lee et al. | |
| 2014/0135040 | A1* | 5/2014 | Edge | H04W 4/025 |
| | | | | 455/456.6 |
| 2014/0149070 | A1* | 5/2014 | Cheng | H04W 4/029 |
| | | | | 702/150 |
| 2014/0172351 | A1 | 6/2014 | Barfield et al. | |
| 2015/0006100 | A1 | 1/2015 | Jackson et al. | |
| 2015/0133145 | A1* | 5/2015 | Palanki | H04W 4/025 |
| | | | | 455/456.1 |
| 2015/0276529 | A1 | 10/2015 | Wiesbauer et al. | |
| 2015/0316383 | A1* | 11/2015 | Donikian | G01C 21/165 |
| | | | | 701/408 |
| 2016/0029966 | A1* | 2/2016 | Salas-Boni | A61B 5/02055 |
| | | | | 600/347 |
| 2016/0091385 | A1 | 3/2016 | Heshmati et al. | |
| 2016/0102995 | A1 | 4/2016 | Gum | |
| 2016/0245716 | A1 | 8/2016 | Gum et al. | |

FOREIGN PATENT DOCUMENTS

| | | | | |
|---|---|---|---|---|
| WO | WO-2004003472 A1 * | 1/2004 | ............... | G01C 5/06 |
| WO | WO 2012155000 A2 * | 11/2012 | ............... | G01C 5/06 |
| WO | WO-2012155000 A2 * | 11/2012 | ............... | G01C 5/06 |
| WO | WO 2012176383 A1 * | 12/2012 | ............. | G01C 21/32 |
| WO | WO-2012176383 A1 * | 12/2012 | ............. | G01C 21/32 |
| WO | WO-2013101005 A1 | 7/2013 | | |

OTHER PUBLICATIONS

International Search Report and Written Opinion—PCT/US2015/018179—ISA/EPO—dated Jul. 1, 2015.

Li B., et al., "Using Barometers to Determine the Height for Indoor Positioning," International Global Navigation Satellite Systems Society IGNSS Symposium, 2013, 12 pages.

Liu G., et al., "Beyond Horizontal Location Context: Measuring Elevation Using Smartphone's Barometer," UBICOMP '14 Adjunct, Sep. 13-17, 2014, pp. 459-468.

Retscher G., et al., "A Multi-Sensor Personal Positioning System for Combined Indoor/Outdoor Environments," 3rd IAG / 12th FIG Symposium, 2006, 8 pages.

* cited by examiner

OPPORTUNISTIC CALIBRATION OF A BAROMETER IN A MOBILE DEVICE

This patent application claims the benefit of and priority to U.S. Provisional Application No. 61/946,255, filed Feb. 28, 2014, entitled, "SYSTEM, METHOD AND/OR DEVICES FOR CALIBRATING BAROMETRIC PRESSURE MEASUREMENTS FOR POSITIONING", U.S. Provisional Application No. 62/062,621, filed Oct. 10, 2014, entitled "OPPORTUNISTIC CALIBRATION OF A BAROMETER IN A MOBILE DEVICE, and U.S. Provisional Application No. 62/120,864, filed Feb. 25, 2015, entitled "OPPORTUNISTIC CALIBRATION OF A BAROMETER IN A MOBILE DEVICE, all of which are assigned to the assignee hereof and incorporated herein in their entirety by reference.

BACKGROUND

1. Field

The subject matter disclosed herein relates to electronic devices, and more particularly to methods, apparatuses and articles of manufacture for use in a mobile device having a barometer or altimeter (these terms being used interchangeably herein).

2. Information

As its name implies, a mobile device may be moved about, e.g. typically being carried by a user and/or possibly a machine. By way of some non-limiting examples, a mobile device may take the form of a cellular telephone, a smart phone, a tablet computer, a laptop computer, a wearable computer, a navigation and/or tracking device, etc.

In certain instances, particularly with indoor navigation applications, it may be useful to determine an altitude level of a mobile device. This may be particularly useful in navigating multi-story environments in which a mobile device may be provided with navigation assistance data such as locations of transmitters, radio heatmaps, digital maps for display, routing maps, etc.

A mobile device may be determined to be located on a particular floor of a building using one or more wireless signal-based positioning techniques. In particular scenarios, it may be desirable to provide estimated locations of a mobile device to include an altitude level component. In a dense urban environment including multistory skyscrapers, for example, merely providing longitude and latitude components for a location in the absence of an altitude level component may be of limited utility for some services (e.g., emergency 911 services).

While obtaining a position fix from acquisition of satellite positioning system (SPS) signals in a rural or single-story suburban environment may provide an altitude level component of sufficient accuracy for most services, an SPS or other like signal-based position fix may not provide an altitude level component with sufficient accuracy or precision.

In certain implementations, a network carrier may populate a dense urban environment with low-power beacon transmitters and/or femtocells to assist subscriber mobile devices in accurately resolving an altitude level component of locations of the mobile devices. Such a deployment of low power beacon transmitters and/or femtocells may, however, prove too costly and/or provide for limited/sporadic coverage.

In another particular implementation, a mobile device may resolve an altitude level component of its location (e.g., as being on a particular floor of a building) by obtaining atmospheric pressure measurements using an onboard barometer and comparing such to a reference atmospheric pressure. However, atmospheric pressure tends to change over time, for example due to weather effects, and hence a reference atmospheric pressure (local to the mobile device) may need to be frequently calibrated. Rather than relying on remote devices to provide reference atmospheric pressure updates, it may be useful for a mobile device to determine a reference atmospheric pressure on its own, for example, through one or more barometer calibration processes which may identify a reference atmospheric pressure corresponding to a particular altitude level.

SUMMARY

Briefly, one particular implementation is directed to a method comprising, at a mobile device: determining that said mobile device is located in an outdoor environment at a ground level; determining that said mobile device is located at a discernible altitude level based, at least in part, on: (i) a signal obtained from a sensor onboard said mobile device; (ii) an electronic map indicative of a local terrain; or (iii) a combination of (i) and (ii); and in response to an estimation that said mobile device is at said discernible altitude level, initiating a calibration process of a barometer onboard said mobile device, said calibration process to identify a reference atmospheric pressure for said discernible altitude level.

Another particular implementation is directed to an apparatus for use in a mobile device, the apparatus comprising: means for determining that said mobile device is located in an outdoor environment at a ground level; means for determining that said mobile device is located at a discernible altitude level based, at least in part, on: (i) a signal obtained from a sensor onboard said mobile device; (ii) an electronic map indicative of a local terrain; or (iii) a combination of (i) and (ii); and means for initiating a calibration process of a barometer onboard said mobile device in response to an estimation that said mobile device is at said discernible altitude level, said calibration process to identify a reference atmospheric pressure for said discernible altitude level.

Another particular implementation is directed to a mobile device, the mobile device comprising: a plurality of sensors, wherein at least one of said plurality of sensors comprises a barometer; memory; and a processing unit to: determine that said mobile device is located in an outdoor environment at a ground level; determine that said mobile device is located at a discernible altitude level based, at least in part, on: (i) a signal obtained from one of said plurality of sensors; (ii) an electronic map stored in said memory and which is indicative of a local terrain; or (iii) a combination of (i) and (ii); and in response to an estimation that said mobile device is at said discernible altitude level, initiate a calibration process of said barometer, to identify a reference atmospheric pressure for said discernible altitude level.

Another particular implementation is directed to a non-transitory computer readable medium having stored therein computer implementable instructions executable by a processing unit of a mobile device to: determine that said mobile device is located in an outdoor environment at a ground level; determine that said mobile device is located at a discernible altitude level based, at least in part, on: (i) a signal obtained from a sensor onboard said mobile device; (ii) an electronic map indicative of a local terrain; or (iii) a combination of (i) and (ii); and initiate a calibration process of a barometer onboard said mobile device in response to an estimation that said mobile device is at said discernible altitude level, said calibration process to identify a reference atmospheric pressure for said discernible altitude level.

It should be understood that the aforementioned implementations are merely example implementations, and that claimed subject matter is not necessarily limited to any particular aspect of these example implementations.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
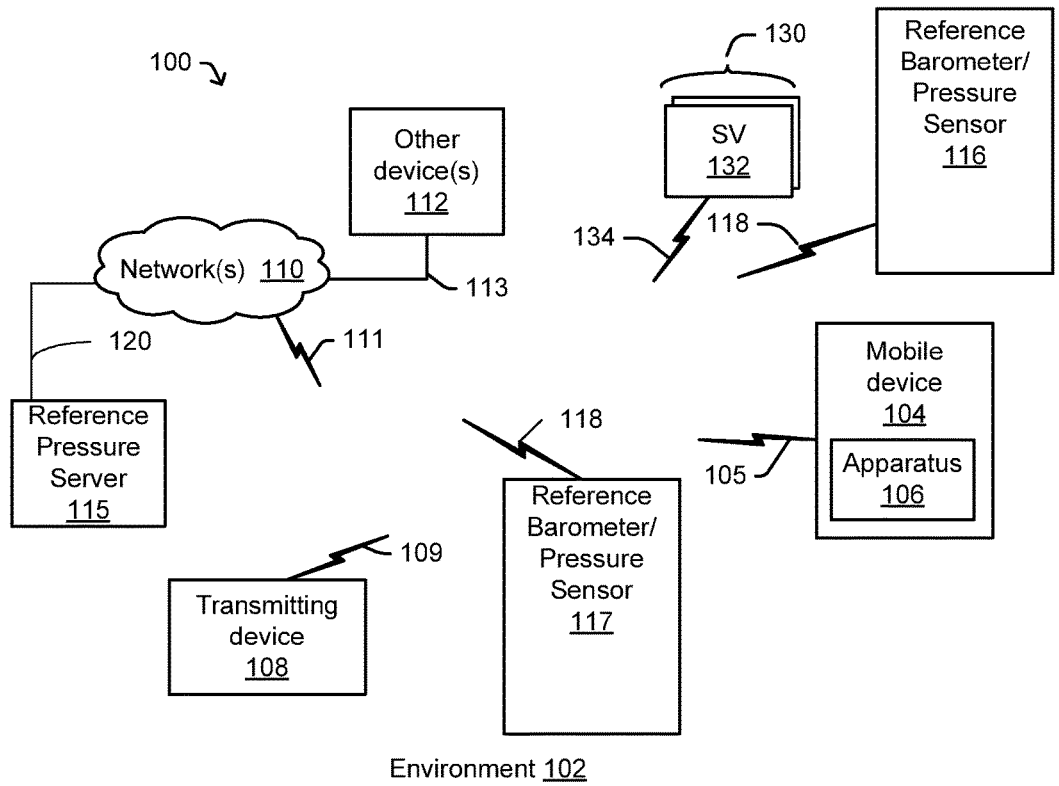
FIG. 1 is a schematic block diagram illustrating an arrangement of representative electronic devices including a mobile device comprising an apparatus for opportunistically calibrating a barometer onboard the mobile device, in accordance with an example implementation.

Various techniques are described herein which may be implemented in a mobile device to initiate one or more calibration processes corresponding to a barometer onboard a mobile device under certain circumstances/conditions. In certain instances such a mobile device may be transportable by a person. As mentioned, it may be useful to calibrate a barometer onboard a mobile device from time to time since atmospheric pressure often changes with over time due to various weather-related phenomena. Further, in certain instances, it may be useful for a mobile device to determine a reference atmospheric pressure corresponding to a particular altitude. For example, with knowledge of such a reference atmospheric pressure and corresponding altitude, it may be possible to estimate an altitude of the barometer (and hence, mobile device) by accounting for the known relationship between altitude and atmospheric pressure. In a particular example implementation for use in an urban environment or within common structures, atmospheric pressure at a particular location may be modeled according to expression (1) as follows:

$$P = P_0 e^{-\int_{z0}^{z1} Mgdz/RT} \quad (1)$$

where:
$P_0$=pressure at reference altitude (e.g., Pascal)
$P$=pressure at current altitude
$T$=temperature (e.g., KK)
$Z_0$=reference altitude (e.g., meters)
$Z_1$=current altitude (e.g., meters)
R=universal gas constant for air: 8.31432 N·m/(mol·K)
g=gravitational acceleration (9.80665 m/s$^2$)
M=molar mass of Earth's air (0.0289644 kg/mol)

For a particular habitable building experiencing relatively small changes in altitude (on a geologic scale), a substantially constant temperature (T), molar mass (M) and gravitational acceleration (g) may be assumed, and expression (1) may be reduced as expression (2) as follows:

$$P = P_0 e^{-Mg(z1-z0)/RT} \quad (2)$$

For extreme differences in altitude ($Z_1$-$Z_0$) and temperature (T), for example, if a mobile device were to travel up an 15,000 foot peak, expression (1) may provide better accuracy than expression (2). However, at extremely high altitudes, a mobile device may be in an outdoor environment and/or able to obtain a highly accurate GNSS-based location fix (which may allow the mobile device to re-calibrate atmospheric pressure measurements of an onboard barometric pressure sensor directly against calculated an altitude without relying on a reference altitude and reference pressure). The mobile device may then be re-calibrated as it descends to more typically inhabited altitudes.

In certain instances, a mobile device may be able to obtain an applicable reference atmospheric pressure for a particular altitude (e.g., via one or more messages from a network resource, a local weather service computer, etc.). In a particular implementation, a reference atmospheric pressure may be, although not necessarily be, provided for sea level. Assuming that the reference pressure sensor is relatively close, e.g., close enough to experience the same weather and barometric effects, altitude may be determined using just the current pressure and the reference pressure, for example, using expressions (1) and (2) above. However, in certain instances a mobile device may be unable to obtain such information. For example, a mobile device may be unable at times to send/receive messages. In another example implementation, there may not be a reference sensor close enough to the mobile device to experience the same or similar weather effects. Furthermore, using a reference pressure sensor does not necessarily account for differences in calibration or calibration drift between a reference pressure sensor and an onboard barometric pressure sensor in a mobile device. For cost reasons, a smaller and/or less expensive barometric pressure sensor, such as one onboard a mobile device, may be less accurately calibrated (or even uncalibrated) or may be subject to calibration drift effects not attributable to weather. Furthermore, in certain implementations, a process to calibrate an onboard barometric pressure sensor from time to time may consume precious resources (e.g., processing resources at a mobile device and/or other devices, communication bandwidth, power supply resources, memory resources, etc.). For these or other reasons, it may be useful for a mobile device to be able to perform one or more calibration processes, for example, to identify a reference atmospheric pressure for a particular known altitude. By taking an actual pressure measurement at a known altitude, and using that pressure measurement and known altitude as a reference pressure and reference altitude, effects associated with a pressure sensor being uncalibrated, miscalibrated or being subject to calibration drift (due to non-weather effects) may be ameliorated.

As described herein, certain techniques may be implemented in a manner that allows for calibration of a barometer onboard a mobile device at certain times, possibly more "opportunistic" times. For example, there may be times when a calibration of a barometer may be less desirable and hence more likely to fail or to include too much uncertainty. One example is that calibrating a barometer while the mobile device is carried by a person riding in a moving elevator, or other source of changing altitude, may be wasteful of resources and/or result in inaccurate calibration. In another example, it may be wasteful of resources to perform a barometer calibration process without being able to estimate an accurate current altitude (a discernable altitude level) of a mobile device.

However, as described herein, some detectable motions or types of motions (motion modes) of a mobile device may actually be indicative, at least in part, of a potential opportunity to initiate one or more barometer calibration processes, and in particular, a calibration process that accounts for differences in initial calibration and/or calibration drift. For example, there may be certain types of motion of a mobile device that may support an inference that the mobile device may be located at a discernable altitude level for an adequate period of time during which there may exist an opportunity to perform one or more barometer calibration processes. For example, it may prove beneficial to initiate a barometer calibration process in response to an estimation that a mobile device may be located at a discernible altitude level. By way of some initial non-limiting examples, there may be an opportunity to initiate a barometer calibration process while a person may be walking along a sidewalk of a portion of a street that may be at a discernable (ground) level within a city, or perhaps riding in a car, bus or train on a roadway or railway at a discernable (ground) level, or perhaps at an elevated level (e.g., a bridge, an highway, etc.), or conversely at a lowered level (e.g., a tunnel, an underpass, etc.). Of course, it may be useful for such motion to occur or remain within a discernible altitude level during the calibration process(es).

Several techniques or embodiments are provided by way of various examples herein that may be used to estimate, at least in part, whether a mobile device may be in a qualifying motion at a discernable altitude level to possibly trigger (initiate) one or more barometer calibration processes. It should be understood, however, that the examples and embodiments provided herein are not necessarily intended to limit claimed subject matter. Moreover, it should also be understood that there may be a variety of different known barometer calibration processes that may be performed and that claimed subject matter is not intended to necessarily be limited to any particular process. Indeed, since such processes are well known and may be particular to a given manufacture of barometer or type of barometer, no specific barometer calibration process will be described herein. As may be appreciated, however, an example barometer calibration process may provide a measured atmospheric pressure serving as, or otherwise support calculation of, a reference atmospheric pressure for a discernible altitude level.

With this in mind, in certain example implementations it may be estimated that a mobile device may be in a qualifying motion at a discernible altitude level based, at least in part, on one or more signals obtained from one or more sensors onboard the mobile device. In an embodiment, such sensor(s) may comprise, for example, one or more environmental sensors, such as, for example, a barometer detecting that the mobile device is at ground level or other known level, a magnetometer detecting a of interference otherwise caused by buildings and other structures, a light sensor detecting daylight frequencies and/or intensities suggesting that the mobile device is out of doors, a sound sensor detecting noises normally associated with the out of doors such as traffic noise or weather noise, a thermometer detecting a temperature transition to outdoor temperatures, a proximity sensor detecting passage through a portal leading to the out of doors, a GNSS or other RF signal sensor that detects stronger or otherwise different signals in an out of doors environment, and/or the like or some combination thereof. In an embodiment, location determination sensors and/or environment sensors may be used to detect that a mobile device is moving fast enough that it is likely to be in an outdoor environment. For example, Doppler measurements from RF signals such as base station signals or WiFi signals or GNSS signals may be used for an indication of speed. In a particular implementation, speed exceeding that of a fast walk, perhaps 5-8 mph may be inferred to be occurring in an outdoor environment. In an embodiment, such sensor(s) may comprise, for example, one or more inertial sensors, such as, for example, an accelerometer, a gyroscope, and/or the like or some combination thereof detecting motion into an environment where altitude is known, such as at ground level or a known floor.

Additionally, in certain example implementations, it may be estimated that a mobile device may be in a qualifying motion at a discernible altitude level based, at least in part, on an electronic map indicative of a local terrain (e.g., indicative of various altitudes, elevations, a topography, etc.). For example, an electronic map or other source, such as an altitude database relative to location, may be indicative of altitude(s) of a ground level of a local terrain, e.g., a street level, sidewalk level, etc. For example, an electronic map may be indicative of an altitude of a raised roadway or railway or a floor of a building, or a tunnel. For example, an electronic map may be indicative of a suspended pedestrian bridge or walkway between certain buildings/structures, possibly along with other information that may be useful in navigating between and/or within such building(s)/structure(s). Similarly, a database may be built by the mobile device or provided by an external source, such as a server, that provides altitude(s) for a particular location. For example, a mobile device may save, in a database, altitudes at which the mobile device dwells at over a threshold amount of time, thereby excluding stairs, elevators, escalators and the like, but including the habitable floors of a building. These floors and their corresponding altitudes (e.g., measured while an onboard barometric pressure sensor is in a calibrated state) could then be detected either through location means (such as via RF or light-based indoor navigation techniques such as WiFi-based location) or, more simply, through the use of existing pressure sensor readings by matching the altitude associated with an existing pressure reading to the altitude of a closest floor. An altitude of a closest floor may then be paired with a current pressure reading to recalibrate an onboard barometric pressure sensor. Similarly, if a mobile device is detected to be in an outdoor environment, a horizontal location (e.g., latitude and longitude or other indication of x and y location) of the mobile device and a horizontal error ellipse (or other error estimate) may be applied to an altitude terrain map to determine an altitude of the mobile device and a variance in possible altitudes. In an embodiment, an estimated altitude of a mobile device may be identified as an altitude on the altitude terrain map associated with an estimated horizontal location of the mobile device. According to an embodiment, an altitude variance or possible altitude error may be identified by subtracting an altitude associated with a highest point within the error ellipse or other horizontal error estimate (on the altitude terrain map) from an altitude associated with a lowest point within the error ellipse or other horizontal error estimate (on the altitude terrain map).

It should be noted that as used herein the term "altitude" may comprise a traditional altitude measurement, e.g., relating to a distance from a reference point/level such as a mean sea level, an Earth-centered coordinate system, etc., and may also or alternatively comprise other types of distance measurements such as a height, an elevation, an offset, etc., that may be relatable to or otherwise correspond to an altitude. Accordingly, as used herein, the phrase "altitude level" may be considered to represent a likely particular "altitude" (e.g., a given distance above sea level, a specific distance from the center of Earth, etc.), a likely range of altitudes (e.g., between two given distances from a reference point, or a particular altitude plus or minus some potential error distance (a measure of uncertainty in this example)), a quantifiable level of a structure (e.g., a floor level of a building, a deck of a bridge, etc.).

As mentioned, in response to an estimation that a mobile device is in located at a discernible altitude level (e.g., a ground level, a bridge level, a tunnel level, a floor level, a particular altitude, etc.), one or more calibration processes corresponding to a barometer onboard the mobile device may be opportunistically initiated to identify a reference atmospheric pressure for the discernible altitude level. In one particular implementation, a mobile device may be determined to be located at a particular discernable altitude if the mobile device is determined to be in a particular qualifying motion, for example. By tying a current pressure to a discernable altitude, effects of a lack of initial calibration, miscalibration and calibration drift may be reduced or eliminated.

In certain example implementations, an estimation that a mobile device may be in a qualifying motion at a discernible altitude level may be based, at least in part, on an estimation that a trajectory of the mobile device is "level". For example, an estimation that a trajectory of the mobile device is level may be based, at least in part, on a comparison of signals and/or measurements obtained from one or more of the sensors onboard the mobile device, such as the pressure sensor, accelerometer and/or pedometer, and/or possibly with comparison to one or more applicable level trajectory threshold values. For example, a trajectory of a mobile device may be deemed level if a measured barometric pressure does not change more than some applicable level trajectory threshold amount over a period of time or at different times. For example, a trajectory of a mobile device may be deemed level if certain inertial sensor measurements remain below some applicable level trajectory threshold levels. For example, such one or more inertial sensors may indicate vertical motion of the mobile device in a direction of a gravity vector, the absence of which or less than some threshold level of which may support an inference of a level trajectory. Of course, these are just a few examples.

In certain example implementations, a trajectory of a mobile device may be estimated to be level based, at least in part, on an estimated velocity of the mobile device, and/or an estimated mode of transportation. For example, a trajectory may be level for a period of time while a person carrying the mobile device is walking, running, riding in a vehicle, etc., which may correspond to an estimated velocity and/or mode of transportation. Here, it may be further useful to consider applicable routes of travel, etc., as indicated may be indicated in an electronic map, along with information from a pedometer, a vehicle speedometer, or other like known function depending on the mode of transportation.

In certain example implementations, a mobile device may be estimated as in motion at a discernible altitude level, based, at least in part, on an estimated movement routine corresponding to the mobile device. Here, for example, a person carrying the mobile device may follow certain routines with regard to their movements. For example, a movement routine may comprise a period of commuting between a place of work and a home during certain times of a day on certain days of a week. Accordingly, during such movement routines, a person may be traveling in according to some more of transportation that may correspond to a level trajectory at times. In another example, a movement routine may be estimated based on a history and/or a schedule that may be identified as corresponding to the mobile device and/or person carrying the mobile device. For example, a person may walk along a sidewalk, ride a train, etc., to attend a lunch meeting, a doctor appointment, a golf tee-time, and/or the like, possibly according to common pattern or routine, and/or some schedule (e.g., possibly identifiable, at least in part, via a text message, a voice message, an electronic mail message, a calendar event, a timer, etc.).

In certain example implementations, a mobile device may be determined to be in a qualifying motion at a discernible altitude level, based, at least in part, on one or more wireless signals acquired from one or more transmitting devices. For example, motion of a mobile device may be indicated via various changes in a wireless signal from a terrestrial-based transmitting device that is not itself moving, e.g., there may be increase or decrease a received signal strength measurement as the mobile device moves closer or farther from a transmitting device, there may be frequency Doppler affect as the mobile device moves closer or farther from such a transmitting device, there may be a loss of signal, there may be a new signal, there may be a handoff of a mobile device from one serving transmitting device to another, etc., just to name a few examples.

Furthermore, in certain instances, an acquired signal may be indicative, at least in part, of a possible discernible altitude level. For example, some transmitting devices may be arranged to provide service to mobile devices within a particular portion of a building or structure, or possibly an outdoor space, which may be indicative of one or more discernible altitude levels. For example, a BLUETOOTH transmitter or a WiFi transmitter may be located within a particular structure and/or at a particular floor or altitude. Even if detectable at other floors, a signal strength of a signal transmitted by one of these transmitters may be measured to determine whether the signal is strong enough to indicate that the mobile device is receiving direct, unimpeded signals (e.g., not going through walls, floors, etc. and therefore on the same floor as the transmitter). In another embodiment, wireless fingerprints using signals from multiple transmitters of various types (WLAN/WiFi, BLUETOOTH, WAN, etc.) may be used to determine a floor. In other embodiments, a wireless signal of a transmitting device may indicate certain location information that may be indicative of one or more discernible altitude levels. For example, a wireless local area network or hotspot on a train may indicate via its signal, such as via decoding a pilot or other broadcast signal or by a map of transmitters that it may correspond to a discernible altitude level. In certain instances, one or more satellite positioning system (SPS) signals may be acquired by a mobile device, which may be used, at least in part, to determine an altitude level, and/or a possible direction of travel and/or velocity for the mobile device.

In another example, a mobile device may be paired with a computing device onboard an automobile (e.g., via BLUETOOTH, or other like communication capability), which may be indicative of a mode of transportation, and/or possibly lead to sharing of other information corresponding to the vehicle or its motion, such as, for example, location information, speed/velocity, heading, pitch, yaw, tilt, etc.

In certain example implementations, one or more barometer calibration processes may be selectively initiated based, at least in part, on a time-based threshold value. For example, it may be useful to initiate a barometer calibration process after a certain period of time corresponding to a time-based threshold value has passed since a last barometer calibration process. Conversely, it may be useful to not initiate a barometer calibration process until a certain period of time corresponding to a time-based threshold value has passed since a last barometer calibration process. In an embodiment, the period of time may be based on a known, pre-specified or estimated drift rate of the pressure sensor on the mobile device. In another embodiment, calibration may be triggered by use of the pressure sensor or some measure of the frequency of use of the pressure sensor. In still another embodiment, calibration may be triggered by a power state such as plugging the mobile device into a charger such as via a wall socket or a car charger. In still another embodiment, calibration may be triggered by user-initiated action such as via a button press or via an on-screen menu selection. As part of a calibration process, in an embodiment, a mobile device may determine altitude without any user command or interaction, if discernable. Alternatively, a mobile device may request an indication of altitude via a user interface, such that a user may enter an indication of altitude that may be used either by itself or along with other information such as an altitude-annotated map or an altitude-location database.

In certain example implementations, it may be useful for a mobile device to further identify and, in some instances, store, an altitude uncertainty value corresponding to a discernible altitude level, and/or a reference pressure reference atmospheric pressure and, in some instances, a reference pressure uncertainty value. Reference pressure value, current pressure value and/or associated uncertainty values, for example, may be useful in other functions within a mobile device and/or possibly in other devices that may make use of measurements obtained from a barometric pressure sensor onboard the mobile device. For example, if a reference pressure value from a reference pressure sensor is recorded at a time of most recent calibration operation, a most recent reference pressure value may subtracted from a current reference pressure value (e.g. Measured at the reference sensor at a current time) to calculate s change in pressure due to weather between the last calibration and the current calibration A difference in atmospheric pressure attributable to a change in weather may then be added to the most recent calibrated pressure value on the mobile device to update the calibrated pressure value for weather-related pressure changes. While this technique may not compensate for pressure sensor drift, this particular technique may be performed without determination of an accurate location or altitude. Similarly, an estimated altitude obtained from barometric pressure measurements may be associated with an estimated error in the estimated altitude.

In certain example implementations, it may be useful for a mobile device to obtain a weather report from another device and to affect an estimation of motion at a discernible altitude level based, at least in part, on the weather report. For example, in certain instances a forecasted rapid change in atmospheric pressure due to a storm front may indicate that, for a period of time, measurements from the barometer onboard the mobile device may be suspect, or that an operative mode of the barometer may be adjusted in some manner (e.g., increase samples, decrease samples), or possibly that more or fewer or different barometer calibration processes may be desirable, or that additional calibration operations against the reference pressure sensor/barometer are desirable, just to name a few examples.

In certain example implementations, it may be useful for a mobile device to transmit one or more messages to one or more other devices which are indicative of a discernible altitude level and a reference atmospheric pressure. Thus, for example, a plurality of mobile devices may report such information and/or the like to a crowd sourcing server, a research service, etc., that may further process, refine, share, study, record, and/or otherwise use the information in some manner.

In certain example implementations, a mobile device may maintain a calibration history corresponding to a plurality of completed barometer calibration operations or, in an embodiment, to a plurality of measured altitudes, for example, altitudes measured while the barometer/pressure sensor is in a calibrated state, associated locations, or associated measured pressures or a combination thereof. For example, a calibration history may be indicative of a plurality of estimated discernible altitude levels and corresponding identified reference atmospheric pressures. These stored values may be related to a particular location. In another embodiment, a calibration history may be indicative of a plurality of estimated discernable altitude levels at a particular location, without associated pressure values for each altitude level, as previously determined discernable altitude levels may be matched against current estimated altitude levels to determine a closest discernable altitude level. In an embodiment, a calibration history may be indicative of various factors that may have been considered and/or otherwise used by the applicable techniques provided herein. In another example, a calibration history may be indicative of a learned routine, pattern, habit, schedule, etc., that may be of use to certain techniques as provided herein. In an embodiment, a calibration history may be indicative of frequently visited locations and/or frequently visited discernable altitudes at given locations. In an embodiment, locations in a calibration history may be approximate or may be indicative of estimated discernable altitudes within a particular building.

Attention is now drawn to FIG. 1, which is a schematic block diagram illustrating an example arrangement 100 comprising various example electronic devices within an environment 102. Environment 102 may comprise an outdoor space, one or more indoor spaces, and/or some combination thereof, in which a mobile device 104 may be located and moved about.

Mobile device 104 may be representative of any electronic device capable of being moved (carried and transported) in some manner by a person within environment 102. Hence, by way of example, mobile device 104 may comprise a cellular telephone, a smart phone, a tablet computer, a laptop computer, a wearable computer, a navigation and/or tracking device, etc. As illustrated, mobile device 104 may comprise an apparatus 106, which may be configured to provide and/or support in some manner one or more of the techniques provided herein. In certain instances, apparatus 106 may comprise hardware/firmware components, or possibly a combination of hardware/firmware and software components.

Accordingly, at times mobile device 104 may be capable of acquiring wireless signals 109 from one or more terrestrial-based transmitting devices 108, and/or wireless signals 111 from network(s) 110. Transmitting device 108 and/or network(s) 110 may be representative of various types of devices, including by way of some examples, a cellular base station, a repeater device, a fempto or pico cell device, a wireless local area network access device, e.g., a WiFi access point, a location beacon transmitting device, etc.

As illustrated in FIG. 1, mobile device 104, transmitting device 108 and network(s) 110 may, for example, communicate via wireless communication links 105, 109 and 111. Further, as illustrated network(s) 110 may be further connected over communication link 113 to one or more other devices 112. While communication link 113 is illustrated as comprising wired communication links, it should be understood that in certain instances communication link 113 may comprise various wired and/or wireless communication links.

Network(s) 110 is intended to represent all or part of one or more other electronic devices and/or communication facilities and/or resources capable of supporting wired and/or wireless electronic communication. Thus for example, network(s) 110 may comprise all or part of a telephone network, a cellular telephone network, a wireless communication network, an intranet, the Internet, and/or the like or some combination thereof.

Further, as shown in FIG. 1, mobile device 104 may, at times, acquire one or more SPS signals 134 transmitted by one or more space vehicles (SVs) 132 of one or more SPS or GNSS systems 130.

Example arrangement 100 also comprises a reference barometer/pressure sensors 116 and 117 that may provide reference pressure measurements to other devices on network(s) 110 via wireless links 118. Here, reference barometer/pressure sensor 116 may be located at a known altitude and in sufficient proximity to mobile device 104 to experience or be affected by the same or similar weather conditions. In a particular implementation, reference barometer/pressure sensor 116 may be located at an airport or may be integrated with a BTS/cell tower (e.g., a BTS/cell tower serving the mobile device). In an embodiment, the mobile device 104 may determine a closest reference barometer/pressure sensor 117 and means to communicate with the closest reference barometer/pressure sensor 117, through a table or database, contained on the mobile device 104 or from a server on the network(s) 110. In an embodiment, mobile device 104 may provide its location or indications of its location to a server, such as a location server or a reference pressure server 115 connected to a network of reference barometer/pressure sensors 117. Reference pressure server 115 may communicate with the reference barometer/pressure sensor 117 closest to mobile device 104 and provide the reference pressure reading to mobile device 104. In an embodiment, the reference barometer/pressure sensor 117 may be located at a serving cell or transmitter in communication with mobile device 104 and may provide the reference pressure and, if not sea level, a reference altitude associated with the reference pressure in a beacon or via other communication to mobile device 104 such as through a query from and response to the mobile device 104 and the serving cell or transceiver (such as transmitting device 108).

In a particular alternative implementation, a separate pressure reference server 115 may keep track of various pressure reference values and be capable of providing mobile device 104 with a closest reference pressure value at known altitude, or providing an almanac of such pressure reference values allowing mobile device 104 to seek out the closest pressure reference value. In an embodiment, the almanac of pressure reference values includes multiple values of pressure reference values for each reference barometer/pressure sensor 117, each associated with a time, where those values may be used to interpolate or otherwise determine weather related pressure changes across periods of time. For example, mobile device 104 may transmit one or more messages to pressure reference server 115 including indicators or parameters indicating a location of mobile device 104. Such indicators or parameters may include, for example, latitude and longitude, a cell identifier for a serving cell, MAC address of a serving WLAN access point, postal code, street address, just to provide a few examples. In an embodiment, the one or more messages to pressure reference server 115 may also include current time and/or time of the last calibration operation on mobile device 104 so that the reference pressure server 115 may provide pressure values for both or for multiple times, or may provide a difference in pressure between a current time and time of a last calibration operation. In an embodiment, the reference pressure server 115 may store a history of pressure at reference barometer/pressure sensors 117 at regular intervals, or in an embodiment, a history of pressure at each reference barometer/pressure sensor 117 at times corresponding to (such as before and after) significant changes in pressure.

In response to the one or more messages from mobile device 104, pressure reference server 115 may provide a response message to mobile device 104 including a reference pressure value and an altitude at which the reference pressure was obtained (e.g., altitude or reference barometer/pressure sensor 116 or 117). In an embodiment, the altitude may be assumed to be sea level and omitted. For example, a response message may identify a reference pressure source (e.g., reference barometer/pressure sensors 116 and 117) that is closest to a location of mobile device 104. In an embodiment, the reference pressure value may be determined as pressure measured at reference barometer/pressure sensor 117, and the reference altitude may be determined as an altitude at reference barometer/pressure sensor 117. In an alternative embodiment, a reference pressure value may be converted to pressure at sea level (altitude=0) and the reference altitude omitted (assumed to be sea level, if not provided). From this reference pressure and altitude in a response message, a current altitude of mobile device 104 and current measurement from an on-board barometric pressure sensor, mobile device 104 may calibrate the on-board barometric pressure sensor for weather related pressure changes. However, in an embodiment, to calibrate for drift in the barometer/pressure sensor in mobile device 104 or for a lack of initial calibration or an inaccurate initial calibration in the barometer/pressure sensor in mobile device 104, mobile device 104 may determine an accurate altitude, and then measure atmospheric pressure at that altitude. Time of a calibration operation and/or a reading from reference barometer/pressure sensor 117 may also be useful to store at a time of a complete calibration operation (including calibrating for pressure sensor drift or lack of initial calibration). These stored values may be used at a later calibration operation to determine weather related changes in pressure between the time of the current calibration and the time of a future calibration operation. Weather related calibration may be particularly useful if location and altitude cannot be accurately determined.

In an alternative implementation, separate pressure reference server 115 or other source may also provide an altitude terrain map enabling mobile device 104 to determine an altitude ground level for its present estimated location. For example, mobile device may apply coordinates of its location (e.g., latitude and longitude or street address) to the altitude terrain map to determine a corresponding altitude for this location (e.g., using well known interpolation techniques). Alternatively, as mentioned elsewhere herein, mobile device 104 may determine its altitude from an SPS fix.

In this context an "altitude terrain map" may include any expression (e.g., such as in electronic form and/or stored in a memory) that relates a horizontal location (e.g., location in a plane or expressed by coordinates such as latitude and longitude) to a corresponding altitude. For example, an altitude terrain map may be expressed as one or more arrays in electronic form and/or as metadata provided with or a part of an electronic map. In a particular implementation, values in an altitude terrain map may define an altitude relative to a reference altitude (e.g., sea level) at a "ground level" indicative of an altitude of a terrain surface. In one implementation, based on an altitude terrain map a special purpose computing apparatus, such as a processor in a mobile device, may be capable of determining or estimating an altitude of such a ground level at a corresponding horizontal location using well known interpolation techniques, for example. For example, in an embodiment, a horizontal location, such as a latitude and a longitude may be applied to an altitude terrain map to determine the altitude at the horizontal location. In an embodiment, a horizontal location error, such as an error ellipse around the horizontal location, may be applied to an altitude terrain map to determine the variance or potential error in the altitude associated with the horizontal location, for example, by determining the difference in altitude between the highest and lowest points within the error ellipse/estimate or, in an embodiment, by determining the maximum of the difference between the altitude at the horizontal location and the highest point within the error ellipse/estimate and the difference between the altitude at the horizontal location and the lowest point within the error ellipse/estimate. In another embodiment, a variance or potential error in an altitude estimate may be determined by determining a maximum of the difference between an average altitude within an error ellipse and a highest point within the error ellipse/estimate, and a difference between the average altitude within the error ellipse and a lowest point within the error ellipse/estimate. Still other embodiments may be utilized such as by using a median altitude instead of the average altitude.

According to an embodiment, a terrain surface at a ground level may comprise portions of an area are natural or graded portions including, for example, portions that are not enclosed by a structure. A ground level may also comprise the surface of a natural body of water such as a river or a lake. A ground level may also be indicative of an altitude of terrain on which a structure or building is supported. In a particular example, a ground level at the entrance of a building may be at about the same altitude as a lobby floor, for example. Here, other floors above or below the lobby floor may be above or below a ground level of the terrain. Also, in an embodiment, an assumption that all floors other than the first floor are normally uniform in height may be utilized to determine the height of the floors within a structure, once the altitude or the altitude difference of at least two floors above the lobby floor have been determined, for example, by measurement by a pressure sensor in the mobile device 104.

According to an embodiment, mobile device 104 may apply a conversion to a pressure reference value obtained from reference barometer/sensor if mobile device 104 and reference barometer/sensor are located at different altitudes (e.g., where atmospheric pressure decreases as altitude increases). For example, mobile device 104 may estimate a pressure drift $\Delta P_{weather}$ to calibrate its on-board altimeter for weather effects according to expression (3) as follows:

$$\Delta P_{weather} = P_h - P_0 e^{-mgh/kT} \quad (3)$$

Where $P_h$ is the pressure at point h (e.g., altitude of a mobile device, measured at the mobile device prior to calibration);

$P_0$ is the pressure at reference point 0 (e.g., as provided in a message from a barometric pressure reference sever);

e is Euler's constant;

m is the mass per air molecule;

g is acceleration due to gravity;

h is a height difference from reference point 0 (e.g., a difference between an altitude at which $P_0$ is measured and an altitude of a mobile device as determined from a terrain map);

k is the Boltzmann constant;

T is temperature at the mobile device in Kelvin; and $\Delta P_{weather}$ is the pressure change due to changes in weather between time of the last calibration of the mobile device and the time of the current calibration/pressure measurement at the mobile device.

In an embodiment, it is assumed that reference barometer/pressure sensor 116 is close to the location of mobile device 104 and, therefore, $P_0$ is obtained from a source (the reference barometer/pressure sensor 116) that is very near to the location of the mobile device and that differences in pressure due to weather differences between the weather at reference pressure server 115 and mobile device 104 may be ignored without substantially affecting calibration of a barometric pressure sensor. A mobile device may apply $\Delta P_{weather}$ computed according to expression (3) to calibrate subsequent pressure measurements obtained from a barometric pressure sensor used for estimating an altitude of the mobile device. It should be understood that expression (3) provides merely an example of how a value of the change in pressure that should be experienced due to weather changes at the mobile device 104. If a nearby (within the same city or perhaps within a few miles) reference barometer/pressure sensor is not available, the previously mentioned complete calibration, using an accurate altitude determined at the mobile device 104 and a pressure reading taken at the mobile device as the reference pressure and reference altitude will not only account for reference barometer/pressure sensor drift and/or miscalibration and/or lack of calibration but will also better account for localized weather effects. In an embodiment, the reference altitude could also be adjusted to zero and the reference pressure similarly scaled using the reduced expression (2) discussed above.

Figure 2:
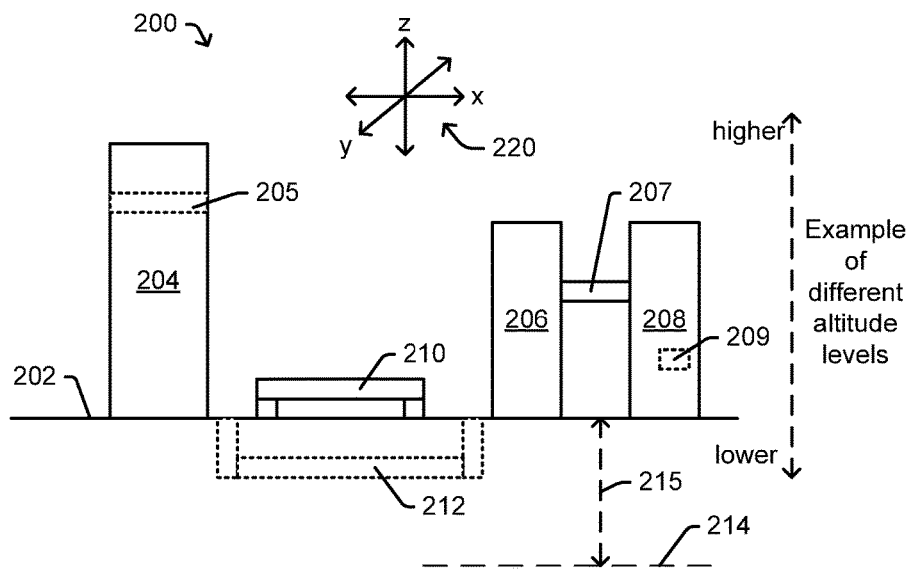
FIG. 2 is an illustrative diagram representing certain example structural and natural features of an environment wherein a mobile device, for example, as in FIG. 1, may be transported about by a person, and wherein in certain instances a barometer onboard the mobile device may be opportunistically calibrated, in accordance with certain example implementations.

Attention is drawn next to FIG. 2, which is an illustrative diagram representing certain example structural and natural features of an urban environment 200 wherein a mobile device, for example, as in FIG. 1, may be transported about by a person, and wherein in certain instances a barometer onboard the mobile device may be opportunistically calibrated, in accordance with certain example implementations. As shown, different example altitude levels may be associated with such features.

As illustrated in FIG. 2, example environment 200 includes a side/cross-sectional view of cityscape having a ground level 202 from which multiple-floor buildings 204, 206 and 208 rise above. Ground level 202 may, for example, support a qualifying motion of person carrying mobile device 104 (FIG. 1). For example, such a person may walk or run (in pedestrian motion), or otherwise be transported may some vehicle or other form of conveyance operating at or about ground level 202. In an embodiment, determination that a mobile device is on a person that is running or being transported by a vehicle may be an indication that the mobile device 104 is at ground level, and may be detected, in an embodiment by, for example, Doppler measured from signals from GNSS/SPS satellites or from WWAN signals, or other signals from transmitting device 108. Similarly, in an embodiment, detection of strong GNSS/SPS signals or a GNSS/SPS location fix may allow determination or confirmation or indications that a mobile device is at ground level 202. In another embodiment, a navigation program and/or mapping program may be used to determine that the mobile device at ground level 202 or other known altitude.

In building 204, a higher floor 205 is indicated. Here, for example, in certain instances higher floor 205 may correspond to a work location for a person at certain times. Higher floor 205 may, for example, support a qualifying (pedestrian) motion of person carrying mobile device 104 or that of the mobile device 104 remaining stationary and/or at constant altitude on higher floor 205. Stairways, elevators and escalators may be ignored based on a relatively rapid change in altitude and hence pressure in comparison to a rate of change for weather-related effects.

In building 208, a portion 209 of a mid-level floor is indicated. Here, for example, in certain instances portion 209 may correspond to a home location for a person. Portion 209 may, for example, support a qualifying (pedestrian) motion of person carrying mobile device 104 (FIG. 1) or that of the mobile device 104 remaining stationary and/or at constant altitude at portion 209. As with building 204, in building 208, stairways, elevators and escalators may be ignored based on a relatively rapid change in altitude and hence pressure in comparison to a rate of change for weather-related effects.

A suspended bridge 207 is shown as connecting buildings 206 and 208 at an altitude level that is higher than ground level 202. Bridge 207 may, for example, support a qualifying (pedestrian) motion of person carrying mobile device 104. In an embodiment, bridge 207 may be differentiated from ground level 202 through navigation and/or mapping, GNSS/SPS location, GNSS/SPS signal levels, accelerometer and/or pedometer measurements, rate of travel (such as determined by GNSS/SPS or other location means or by using an accelerometer and/or pedometer; velocity in a bridge 207 may be at about a walking pace rather than running or driving) or a combination thereof. In an embodiment, bridge 207, raised portion 210, or lowered portion 212 may also be detected by a pressure sensor within mobile device 104, either by the pressure at a raised or lowered portion, or by a change in pressure during transitions between different levels. Similarly, in an embodiment, altitudes of bridge 207, raised portion 210, and lowered portion 212 or other areas may be determined using a barometric pressure sensor onboard mobile device 104. If these altitudes are measured while the barometric pressure sensor is calibrated, and associated with a location or area, these altitudes may be used to determine a known altitude for future calibration operations at the same location or area.

A raised portion 210 is also shown at an altitude level that is higher than ground level 202, and may be detected through similar means or combinations of means as used to detect bridge 207. If raised portion 210 is at a determined altitude such as provided via a map, navigation, and/or a prior altitude determination by mobile device, the altitude of raised portion 210 may be used for a complete calibration operation. Raised portion 210 may, for example, support a qualifying motion of person carrying mobile device 104. For example, a person may walk along an elevated pathway or bridge, or may be carried by some mechanism along an elevated roadway or railway, etc., as represented by raised portion 207.

A lowered portion 212 is also shown at an altitude level that is lower than ground level 202. Lowered portion 212 may, for example, support a qualifying motion of person carrying mobile device 104. For example, a person may walk along a below-ground trench or tunnel, or may be carried by some mechanism along an underground roadway or railway, etc., as represented by lowered portion 212.

As shown in FIG. 2, in certain instances, ground level 202 may itself be offset by some distance 215 from some other reference level and/or point represented by item 214. By way of example, item 214 may represent a mean sea level, a center point of an Earth centered coordinate system, as are well known. By way of further reference, a three axis coordinate system that may be applied is indicated by item 220, showing an x-axis, a y-axis and a z-axis, that may have its origin at Earth center. Thus, in such example coordinate system, different altitude levels increase/decrease along the z-axis. Similarly, as known, a gravity vector may be detected by certain inertial sensors which may similarly be aligned with the z-axis.

In an embodiment, a mobile device may calibrate an on-board barometric pressure sensor (altimeter or barometer) based on a current reference pressure and an altitude (e.g., assumed if sea level is used as the reference altitude) at which the current reference pressure was measured and/or adjusted to (as obtained from the reference barometer/pressure sensor 117 or from reference pressure server 115), a prior reference pressure value and a reference altitude, measured at a reference barometer/pressure sensor 117' at the time of a most recent calibration operation of the pressure sensor at mobile device 104, and the mobile device's current pressure measurement from the onboard barometric pressure sensor. It is pointed out that reference barometer/pressure sensor 117 and reference barometer/pressure sensor 117' may comprise the same device or different devices at different locations. In addition, in an embodiment, a mobile device may calibrate an on-board barometric pressure sensor by determining an accurate altitude, such through means mentioned above, measuring ae current barometric pressure and using the measured altitude and a reference barometric pressure value and reference altitude. In addition, the reference barometric pressure value and altitude may be adjusted (e.g., based on a measured pressure and measured altitude) to an equivalent reference for zero altitude using previously stated expressions for pressure variation with change in altitude. Also as pointed out above, a mobile device may apply coordinates of its location to an altitude terrain map to estimate or determine its altitude under certain conditions such as the mobile device being located at ground level such that its altitude at a particular location matches an altitude in the altitude terrain map corresponding to a current location of the mobile device. This may not be the case, however, if the mobile device is located in a multistory building above ground or on some other structure above ground as defined in the altitude terrain map. This can often be detected using an on-board barometric pressure sensor to differentiate between or among known floors and/or ground level, which can then be used in a subsequent calibration operation. As discussed below in particular implementations, a mobile device may infer its altitude relative to a ground level as defined in an altitude terrain map based, at least in part, on motion attributes and/or sensor readings such as altimeter readings, Doppler readings and other measurements as previously mentioned.

Figure 3A:
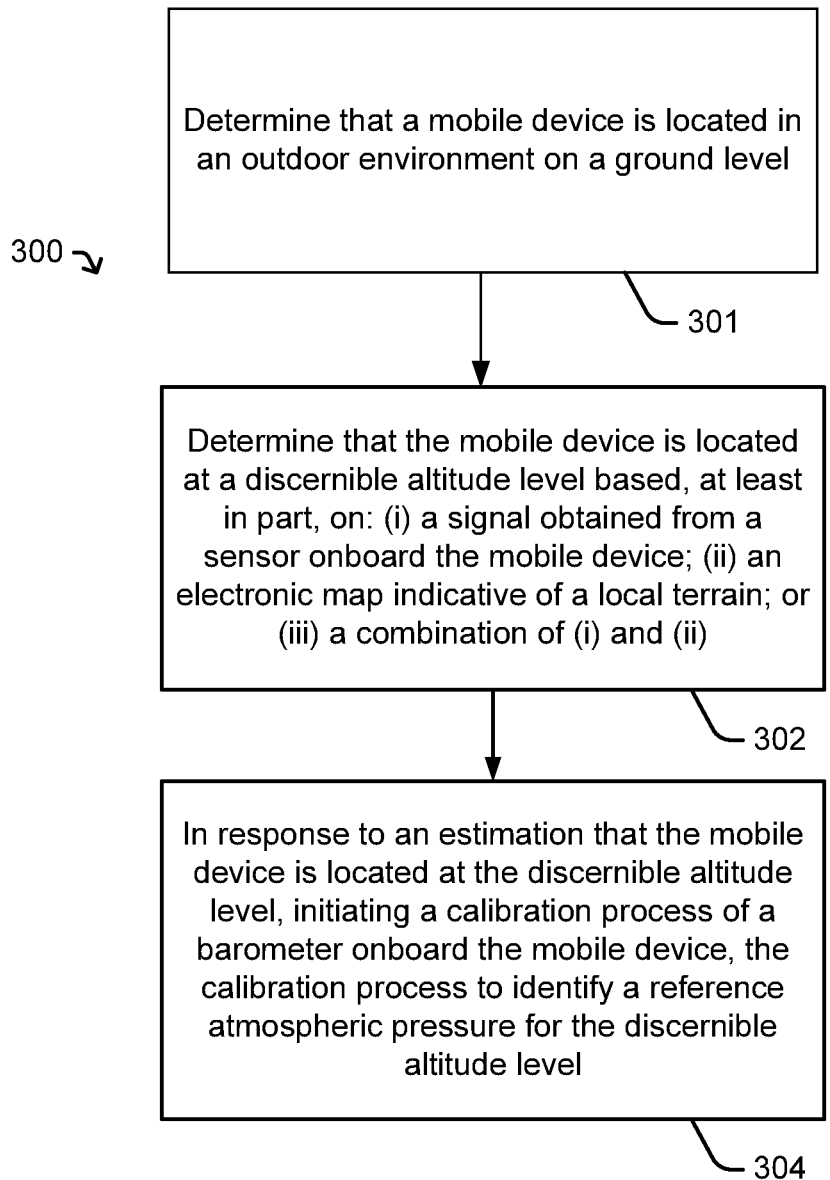
FIG. 3A and FIG. 3B are flow diagrams illustrating some example processes that may be implemented using a mobile device, for example, as in FIG. 1, to opportunistically calibrate a barometer onboard the mobile device, in accordance with certain example implementations.

Attention is drawn next to FIG. 3A, which is a flow diagram illustrating an example process 300 that may be implemented using a mobile device 104 to opportunistically calibrate a barometer onboard the mobile device. By way of example, process 300 may be implemented in whole or in part by mobile device 104 and/or apparatus 106 provisioned therein (FIG. 1). At block 301, a mobile device may determine that it is located on a ground level in an outdoor environment based on any one of several observations. In some embodiments, a mobile device 104 may alternatively determine that it is otherwise located in a known environment such as on a known floor of a building, a known road, bridge or other environment for which an altitude is known. In one implementation, signals from an onboard sensor (e.g., SPS/GNSS receiver, communications transceiver, light sensor, camera, temperature sensor or vibrational sensor, or any combination thereof). For example, a mobile device may determine that it is located on a ground level and in an outdoor environment based, at least in part, on a GNSS position fix based on acquisition of GNSS/SPS signals, received GNSS signal strength, or a GNSS-based location. In a related embodiment, a location and/or environment of the mobile device may be determined or characterized through measurement of other RF signals such as WWAN, BLUETOOTH and WiFi and may be based on an RF fingerprint, a determined location and/or determinations of signal strength and/or round trip time to known transceivers. In another example, as discussed above, a mobile device may infer that it is in an outdoor environment if it is detected that the mobile device is in a qualifying motion reflective of a location on a ground level and in an outdoor environment such as velocity over walking speeds.

In another example, a mobile device may comprise an almanac indicating horizontal locations and displacement of local buildings and subterranean structures (e.g., subways). Here, if an estimate of a horizontal location is determined to be located where no buildings or subterranean structures are present, a mobile device may infer that the mobile device is located on a ground level and an outdoor area.

In another example, a mobile device may be determined to be located on a ground level and in an outdoor area based, at least in part, on a history of detected movements (e.g., as detected based on signals generated by one or more inertial sensors onboard the mobile device and/or based on measurements by the onboard altimeter) suggestive of travelling over a particular outdoor contour (e.g., matching a particular portion of an electronic terrain map).

A mobile device may determine that it located in an outdoor environment and at a ground level based, at least in part, on one or more signals obtained from one or more sensors onboard the mobile device, an electronic map indicative of a local terrain, or some combination thereof. As mentioned, certain detectable motions of a mobile device may qualify as providing an opportunity to perform a barometer calibration, given a discernible altitude level being identified. For example, an estimated level trajectory may support an inference of a qualifying motion. For example, an estimated motion mode or mode of transportation may be indicative of a qualifying motion.

In an example scenario, a motion speed of a mobile device may be sufficiently high and sustained to infer that the mobile device is not constrained within a building or other indoor environment. For example, from a sufficiently high and sustained speed of a mobile device it may be inferred that the mobile device is travelling in an automobile on a road at a discernable "ground level." In a particular example implementation, a latitude and longitude of the mobile device may be known roughly (e.g., from terrestrial positioning techniques such as SPS, Advanced Forward Trilateration (AFLT) or cell ID of a serving cell). If it is inferred that the mobile device is on a non-indoor ground level (e.g., based on a sufficiently high and sustained speed), an altitude of the mobile device may be estimated from an altitude terrain map by referencing the latitude and longitude to the altitude terrain map.

At block 302, a mobile device may determine that it is located at a discernable altitude with sufficient accuracy and precision to reliably calibrate a barometric pressure sensor. As discussed below at example block 304, this discernable altitude may then be used in a process to calibrate a barometric pressure sensor or altimeter onboard a mobile device. In one example, a barometric pressure sensor may be subsequently calibrated by using a barometric pressure measured at the discernable altitude as a new reference barometric pressure value and using and the discernable altitude as new reference altitude corresponding to the new reference barometric pressure value. In another example, a barometric pressure measurement obtained at the discernable altitude may be adjusted to sea level (zero altitude) based, at least in part, on a difference between the discernable altitude and sea level. In one implementation, a mobile device may determine that it is located at a discernable altitude based, at least in part, on a reliable GNSS position fix that provides an altitude component. Other embodiments to determine a discernable altitude are discussed above, such as applying a determined location to a terrain map.

In other example implementations, different types of motion may be used to infer an altitude of a mobile device. For example, if it is known that a mobile device is close to a body of water and a motion speed of the mobile device is similar to that of a boat travelling on the top surface of the body of water, it may be inferred that the altitude of the mobile device is that of the body of water. In another example, if it is known that a mobile device is close to a train track and a motion speed of the mobile device is similar to that of a train travelling on the train track, it may be inferred that the altitude of the mobile device is that of a train travelling on the train tracks. It should be understood, however, that these are merely examples of how it may be determined that a mobile device is at a discernable level based on motion, and claimed subject matter is not limited in this respect.

At example block 304, in response to determination that the mobile device is located at a discernible altitude level, one or more calibration processes corresponding to a barometer onboard the mobile device may be initiated, for example, to identify a reference atmospheric pressure for the discernible altitude level. As may be appreciated, such a reference atmospheric pressure may subsequently be used for a period of time $t_0$ estimate an altitude level based on further atmospheric pressure measurement(s). For example, a difference between a subsequent atmospheric pressure measurement and such reference atmospheric pressure may indicate that the mobile device may be located on a particular floor or level of a building.

Figure 3B:
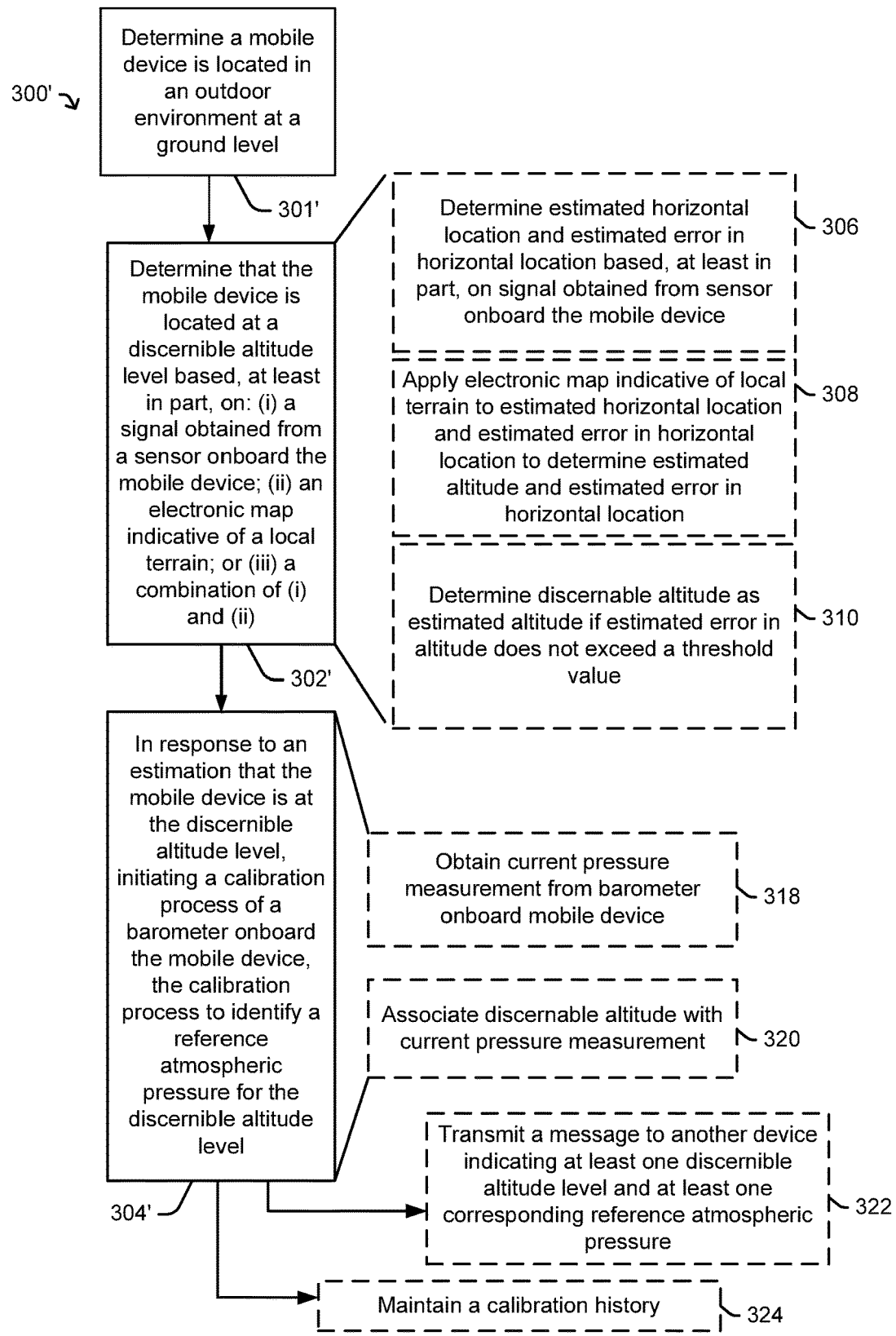

Attention is drawn next to FIG. 3B, which is a flow diagram illustrating an example process 300' that may be implemented using a mobile device to opportunistically calibrate a barometer onboard the mobile device. By way of example, process 300' may be implemented in whole or in part by mobile device 104 and/or apparatus 106 provisioned therein. In comparison with process 300 of FIG. 3A, example process 300' comprises additional example blocks 306, 308 and 310 that may, in certain instances, be performed as part of example block 302', additional example blocks 318 and 320 that may, in certain instances, be performed as part of example block 304', and/or additional example blocks 322 and/or 324 that may, in certain instances, be performed in addition to example blocks 302, 302', 304, and/or 304'. At example block 302', a mobile device may estimate that it is located at a discernible altitude level based, at least in part, on one or more signals obtained from one or more sensors onboard the mobile device, an electronic map indicative of a local terrain, or some combination thereof.

In the particular embodiment illustrated in FIG. 3B, block 302' may be executed by multiple actions shown at blocks 306, 308 and 310. Block 306 may comprise obtaining estimates of latitude and longitude of a location of a mobile device, and estimated errors in these estimates. This may be obtained from one or more signals obtained from a sensor onboard the mobile device such as, for example, an SPS receiver, accelerometers, gravitometers, gyroscopes, microphones, WLAN transceiver, WWAN transceiver, WPAN transceiver, and/or the on-board altimeter or combinations thereof, just to provide a few examples. Block 308 may apply an electronic terrain map (e.g., stored locally in a memory) to the estimated horizontal location and estimated horizontal location error in that estimate to provide an estimated altitude and an estimated altitude error in that altitude estimate (e.g., using interpolation techniques as discussed above). At block 310, if the estimated error in the altitude estimate is less than a threshold value (for example, less than half of a typical floor height), the discernable altitude may be determined to be the estimated altitude.

At example block 304', in response to an estimation that the mobile device is located at the discernible altitude level, one or more calibration processes corresponding to a barometer onboard the mobile device may be initiated, for example, to identify a reference atmospheric pressure for the discernible altitude level.

As previously mentioned and now shown at example block 318, a mobile device may obtain one or more current barometric pressure measurements from an onboard barometric pressure sensor. The one or more current barometric pressure measurements obtained at block 318 may be obtained contemporaneously with measurements for determining the estimated horizontal location at block 306 or estimated altitude at block 308. Block 320 may then associate the one or more current barometric pressure measurements obtained at block 318 with the discernable altitude determined at block 310. The barometric pressure sensor obtaining the one or more barometric pressure measurements at block 318 may then be calibrated as discussed above.

In certain example implementations, process 300' may, at example block 322, comprise having the mobile device transmit one or more messages to one or more other devices, and such messages may indicate, at least in part, a discernible altitude level and corresponding reference atmospheric pressure. In one particular implementation, such a message comprising a discernable altitude level may be transmitted in response to an emergency event and used to assist in directing an emergency response to the emergency event. In another particular implementation, such a message comprising a discernable altitude level may also be used in directing advertisement delivery to the mobile device (e.g., directing advertisement content to the mobile device determined or selected based, at least in part, on the discernable altitude in the message).

In certain example implementations, process 300' may, at example block 324, comprise maintaining a calibration history. For example, a calibration history may correspond to one or more completed barometer calibration processes and/or may be indicative of one or more estimated discernible altitude levels and corresponding identified reference atmospheric pressures.

In particular scenarios, a mobile device may not be able to discern an altitude of its location with sufficient reliability or accuracy for calibration of an onboard barometric pressure sensor. For example, an estimated error in an estimated altitude determined at block 308 may exceed a threshold value at block 310 (for example, it might exceed the height associated with a floor height or some fraction thereof such as an accurate floor determination cannot be made indoors), indicating that the estimated altitude is not sufficiently reliable or accurate. Nevertheless, in particular implementations, a mobile device may still be capable of correcting for weather effects. As pointed out above in connection with FIG. 1, reference pressure server 115 may store a history of reference barometric pressure measurements obtained by reference barometric pressure sensors 116 and 117. This stored history of barometric pressure measurements may be used to calibrate measurements obtained at a current time $t_1$ from an onboard barometric pressure sensor for changes in weather according to expression (3) as follows:

$$\Delta P_{weather}(t_1) = P_{ref}(t_1) - P_{ref}(t_0) \quad (3)$$

where:
$P_{ref}(t_1)$ is a reference pressure value obtained at a current time $t_1$ at a reference point (e.g., at a location of a reference barometric pressure sensor);
$P_{ref}(t_0)$ is a reference pressure value obtained at a time in the past to (e.g., at a time when an onboard barometric pressure sensor was previously calibrated).

According to an embodiment, a mobile device may calibrate an onboard barometric pressure sensor according to expression (3) to correct for changes in weather from a time $t_0$, when the mobile device was previously calibrated, to a time $t_1$. In one particular implementation, a mobile device may obtain a value for $P_{ref}(t_0)$ from a reference pressure server at some time in the past, and then store the obtained value for $P_{ref}(t_0)$ in an onboard memory device. For example, the mobile device may have used the obtained value for $P_{ref}(t_0)$ in a previous calibration operation. Alternatively, the mobile device may transmit a query message to a reference pressure server (e.g., reference pressure server 115) requesting a pressure reference value for a particular reference barometer/pressure sensor obtained at time $t_0$.

A mobile device may reliably calibrate an onboard barometric pressure sensor for pressure changes due to weather based on a value for $P_{ref}(t_0)$ (e.g., using expression (1) or (2) above) if the mobile device at time $t_0$ is sufficiently proximate to a location of a reference sensor obtaining value $P_{ref}(t_0)$ to avoid significant variation in weather between the location of the reference sensor and a location of the mobile at time $t_0$. Similarly, the mobile device may reliably calibrate the onboard barometric pressure sensor at time $t_1$ if the mobile device at time $t_1$ is also sufficiently proximate to the reference sensor obtaining value $P_{ref}(t_1)$ to avoid significant variation in weather between the location of the reference sensor and a location of the mobile at time $t_1$.

Figure 4:
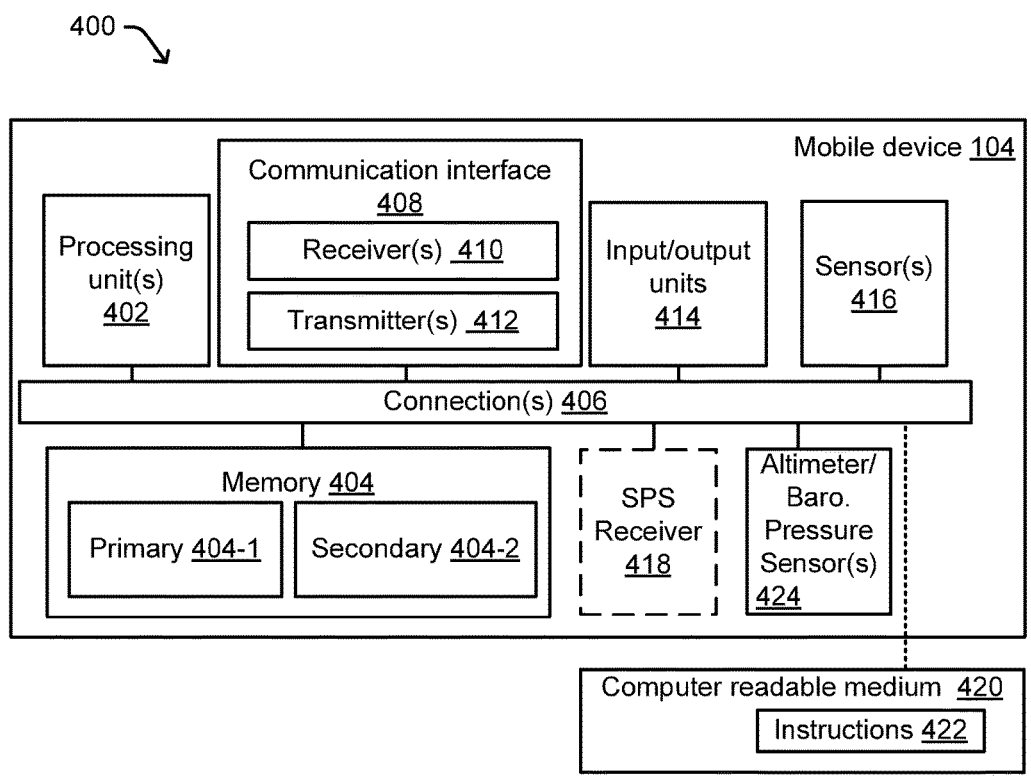
FIG. 4 is a schematic diagram illustrating certain features of an example special purpose computing platform that may be provisioned within a mobile device, for example, as in FIG. 1, and which may benefit from the techniques for opportunistic barometer calibration, for example, as in FIG. 3A and FIG. 3B, in accordance with certain example implementations.

Attention is now drawn to FIG. 4, which is a schematic diagram illustrating certain features of an example special purpose computing platform 400 that may be provisioned within a mobile device 104 and/or apparatus 106, in accordance with certain example implementations.

As illustrated special computing platform 400 may comprise one or more processing units 402 (e.g., to perform data processing in accordance with certain techniques provided herein) coupled to memory 404 via one or more connections 406 (e.g., one or more electrical conductors, one or more electrically conductive paths, one or more buses, one or more fiber-optic paths, one or more circuits, one or more buffers, one or more transmitters, one or more receivers, etc.). Processing unit(s) 402 may, for example, be implemented in hardware or a combination of hardware and software. Processing unit(s) 402 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof. Processing unit(s) 402 may, for example, perform computer implementable instructions corresponding to one or more applications(s) 152 (FIG. 1).

Memory 404 may be representative of any data storage mechanism. Memory 404 may include, for example, a primary memory 404-1 and/or a secondary memory 404-2. Primary memory 404-1 may comprise, for example, a random access memory, read only memory, etc. While illustrated in this example as being separate from the processing units, it should be understood that all or part of a primary memory may be provided within or otherwise co-located and coupled with processing unit 402 or other like circuitry within mobile device 104. Secondary memory 404-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 420. Memory 404 and/or non-transitory computer readable medium 420 may comprise instructions 422 for use in performing data processing, e.g., in accordance with the applicable techniques as provided herein.

Special purpose computing platform 400 may, for example, further comprise one or more communication interface 408. Communication interface 408 may, for example, comprise one or more wired and/or wireless network interface units, radios, modems, etc., represented here by one or more receivers 410 and one or more transmitters 412. It should be understood that in certain implementations, communication interface 408 may comprise one or more transceivers, and/or the like. Further, it should be understood that although not shown, communication interface 408 may comprise one or more antennas and/or other circuitry as may be applicable given the communication interface capability.

In accordance with certain example implementations, communication interface 408 may, for example, be enabled for use with various wired communication networks, e.g., such as telephone system, a local area network, a wide area network, a personal area network, an intranet, the Internet, etc.

In accordance with certain example implementations communication interface 408 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, variations or versions thereof, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMBP capability), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a BLUETOOTH network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, communication interface(s) 408 may further provide for infrared-based communications with one or more other devices. A WLAN may, for example, comprise an IEEE 802.11x network, and a WPAN may comprise a BLUETOOTH network, an IEEE 802.15x, for example. Wireless communication implementations described herein may also be used in connection with any combination of WWAN, WLAN or WPAN.

Mobile device 104 may, for example, further comprise one or more input and/or output units 414. Input and/or output units 414 may represent one or more devices or other like mechanisms that may be used to obtain inputs from and/or provide outputs to one or more other devices and/or a user. Thus, for example, input and/or output units 414 may comprise various buttons, switches, a touch pad, a trackball, a joystick, a touch screen, a keyboard, a microphone, a camera, and/or the like, which may be used to receive one or more user inputs. In certain instances, input and/or output units 414 may comprise various devices that may be used in producing a visual output, an audible output, and/or a tactile output for a user. For example, input and/or output units 414 may be used to present a video display, graphical user interface, positioning and/or navigation related information, visual representations of electronic map, routing directions, etc., via a display mechanism and/or audio mechanism.

Mobile device 104 may, for example, comprise one or more sensors 416. For example, sensor(s) 416 may represent one or more environmental sensors, such as, e.g., a magnetometer or compass, a barometer or altimeter, etc., and which may be useful for positioning. For example, sensor(s) 416 may represent one or more inertial sensors, which may be useful in detecting certain movements of mobile device 104. Thus, for example, sensor(s) 416 may comprise one or more accelerometers, one or one or more gyroscopes. Further, in certain instances sensor(s) 416 may comprise and/or take the form of one or more input devices such as a microphone, a camera, a light sensor, etc. In addition, mobile device may comprise altimeter/barometric pressure sensor(s) 424 (also referred to as an onboard altimeter herein) capable of obtaining barometric pressure measurements and/or measuring an altitude. Measurements obtained from altimeter/barometric pressure sensor(s) 424 may be stored in memory 404 for use in positioning operations, for example. In addition, Measurements obtained from altimeter/barometric pressure sensor(s) 424 may be calibrated using processes and techniques described herein. In this context, barometer, barometric pressure sensor and altimeter may be used interchangeably throughout this specification.

Mobile device 104 may, for example, comprise an SPS receiver 418 capable of acquiring SPS signals 134 via one or more antennas (not shown). SPS receiver 418 may also process, in whole or in part, SPS signals 134 for estimating a position and/or a motion of mobile device 104. In certain instances, SPS receiver 418 may comprise one or more processing unit(s) (not shown), e.g., one or more general purpose processors, one or more digital signal processors DSP(s), one or more specialized processors that may also be utilized to process acquired SPS signals, in whole or in part, and/or calculate an estimated location of mobile device 104. In certain implementations, all or part of such processing of acquired SPS signals may be performed by other processing capabilities in mobile device 104, e.g., processing unit(s) 402, memory 404, etc., in conjunction with SPS receiver 418. Storage of SPS or other signals for use in performing positioning operations may be performed in memory 404 or registers (not shown).

In certain instances, sensor(s) 416 may generate analog or digital signals that may be stored in memory 404 and processed by DSP(s) (not shown) or processing unit(s) 402 in support of one or more applications such as, for example, applications directed to positioning or navigation operations based, at least in part, on one or more positioning functions.

Processing unit(s) 402 may comprise a dedicated modem processor or the like that may be capable of performing baseband processing of signals acquired and downconverted at receiver(s) 410 of communication interface 408 or SPS receiver 418. Similarly, a modem processor or the like may perform baseband processing of signals to be upconverted for transmission by (wireless) transmitter(s) 412. In alternative implementations, instead of having a dedicated modem processor, baseband processing may be performed by a general purpose processor or DSP (e.g., general purpose and/or application processor). It should be understood, however, that these are merely examples of structures that may perform baseband processing, and that claimed subject matter is not limited in this respect. Moreover, it should be understood that the example techniques provided herein may be adapted for a variety of different electronic devices, mobile devices, transmitting devices, environments, position fix modes, etc.

Figure 5:
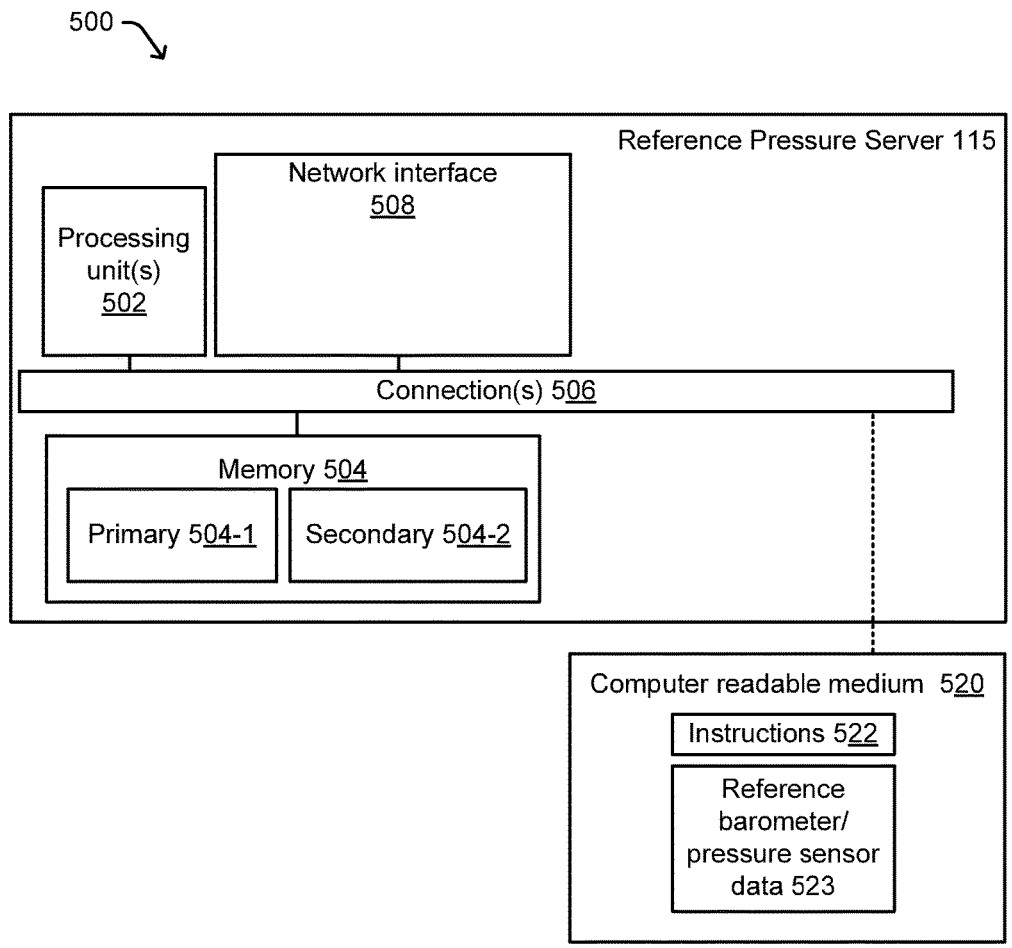
FIG. 5 is a schematic diagram of a reference pressure server according to an embodiment.

Attention is now drawn to FIG. 5, which is a schematic diagram illustrating certain features of an example special purpose computing platform 500 that may be provisioned within a reference pressure server 115, in accordance with certain example implementations.

As illustrated special computing platform 500 may comprise one or more processing units 502 (e.g., to perform data processing in accordance with certain techniques provided herein) coupled to memory 504 via one or more connections 506 (e.g., one or more electrical conductors, one or more electrically conductive paths, one or more buses, one or more fiber-optic paths, one or more circuits, one or more buffers, one or more transmitters, one or more receivers, etc.). Processing unit(s) 502 may, for example, be implemented in hardware or a combination of hardware and software. Processing unit(s) 502 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof. Processing unit(s) 502 may, for example, perform computer implementable instructions corresponding to collecting, storing and/or disseminating reference barometer/pressure sensor data 523. Reference barometer/pressure sensor data 523 may include reference barometer/pressure sensor data 523 may include reference barometer/pressure sensor measurements and associated measurement times and associated locations of each reference barometer/pressure sensor 117 that measured the data in the reference barometer/pressure sensor data 523.

Memory 504 may be representative of any data storage mechanism. Memory 504 may include, for example, a primary memory 504-1 and/or a secondary memory 504-2. Primary memory 504-1 may comprise, for example, a random access memory, read only memory, internal and/or external memory, hard drives, etc. While illustrated in this example as being separate from the processing units, it should be understood that all or part of a primary memory may be provided within or otherwise co-located and coupled with processing unit 502 or other like circuitry within reference pressure server 115. Secondary memory 504-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 520. Memory 504 and/or non-transitory computer readable medium 520 may comprise instructions 522 for use in performing processing, storage and/or dissemination of reference barometer pressure sensor data 523, e.g., in accordance with the applicable techniques as provided herein.

Special purpose computing platform 500 may, for example, further comprise one or more network interface 508 or other communication interface. Network interface 508 may, for example, comprise one or more wired and/or wireless network interface units, radios, modems, etc. It should be understood that in certain implementations, communication interface 508 may comprise one or more transceivers, and/or the like. Further, it should be understood that although not shown, communication interface 508 may comprise one or more antennas and/or other circuitry as may be applicable given the communication interface capability.

In accordance with certain example implementations, communication interface 508 may, for example, be enabled for use with various wired communication networks, e.g., such as telephone system, a local area network, a wide area network, a personal area network, an intranet, the Internet, etc.

In accordance with certain example implementations communication interface 508 may, for example, be enabled for use with various wired communication networks such as Ethernet, TCP/IP and/or wireless communication networks such as a wireless wide area network (WWAN), a wireless local area network (WLAN), a wireless personal area network (WPAN), and so on. The term "network" and "system" may be used interchangeably herein.

The techniques described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing", "computing", "calculating", "determining", "generating", "obtaining", "modifying", "selecting", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at a mobile device:
   determining that said mobile device is located in an outdoor environment based, at least in part, on (i) a history of detected movements of said mobile device; (ii) at least one signal obtained by at least one sensor onboard said mobile device; (iii) at least one signal acquired from at least one transmitting device; (iv) an electronic map indicative of local terrain or (v) an almanac indicative of horizontal locations and displacement of structures, or (vi) a combination thereof;
   determining that said mobile device has a level trajectory based, at least in part, on (i) at least one signal obtained by at least one sensor onboard said mobile device; (ii) an estimated velocity of said mobile device or (iii) an estimated mode of transportation of a person holding said mobile device, or (iv) a combination thereof;
   determining that said mobile device is located at a discernible altitude level based, at least in part, on: (i) said at least one signal obtained from said at least one sensor onboard said mobile device; (ii) said electronic map indicative of said local terrain; (iii) an estimated movement routine corresponding to said mobile device or (iv) said at least one wireless signal acquired from at least one transmitting device, or (v) a combination thereof; and
   in response to a determination that said mobile device is located in said outdoor environment, has said level trajectory and is at said discernible altitude level, initiating a calibration process of a barometer onboard said mobile device, said calibration process to identify a reference atmospheric pressure for said discernible altitude level.

2. The method as recited in claim 1, wherein determining that said mobile device is located at said discernable altitude level further comprises:

applying said electronic map indicative of said local terrain to said estimated horizontal location to determine an estimated altitude of said mobile device.

3. The method as recited in claim 2, wherein determining that said mobile device is located at said discernable altitude level further comprises:
estimating an error in said estimated altitude; and
determining said discernable altitude level as said estimated altitude if said estimated error is less than a threshold value.

4. The method as recited in claim 1, wherein determining that said mobile device is located at said discernable altitude level further comprises: determining that said mobile device is in motion at said discernible altitude level, based, at least in part, on a change in said at least one wireless signal acquired from said at least one transmitting device.

5. The method as recited in claim 1, and further comprising, at said mobile device:
obtaining said history of detected movements suggestive of travelling over a particular outdoor contour of said local terrain.

6. The method as recited in claim 1, and further comprising, at said mobile device: identifying: (1) an altitude uncertainty value corresponding to said discernible altitude level; (2) a reference pressure uncertainty value corresponding to said reference atmospheric pressure; or (3) both (1) and (2).

7. The method as recited in claim 1, and further comprising, at said mobile device: transmitting a message to another device, said message being indicative of said discernible altitude level and said reference atmospheric pressure.

8. The method as recited in claim 1, and further comprising, at said mobile device: maintaining a calibration history corresponding to a plurality of completed calibration operations, said calibration history being indicative of at least a plurality of estimated discernible altitude levels, times of said plurality of completed calibration operations or reference atmospheric pressure values corresponding to said completed calibration operations, or any combination thereof, wherein determining that said mobile device is located at said discernible altitude level is further based, at least in part, on said calibration history.

9. An apparatus for use in a mobile device, the apparatus comprising:
means for determining that said mobile device is located in an outdoor environment based, at least in part, on (i) a history of detected movements of said mobile device; (ii) at least one signal obtained by at least one sensor onboard said mobile device; (iii) at least one signal acquired from at least one transmitting device; (iv) an electronic map indicative of local terrain or (v) an almanac indicative of horizontal locations and displacement of structures, or (vi) a combination thereof;
means for determining that said mobile device has a level trajectory based, at least in part, on (i) at least one signal obtained by at least one sensor onboard said mobile device; (ii) an estimated velocity of said mobile device or (iii) an estimated mode of transportation of a person holding said mobile device, or (iv) a combination thereof;
means for determining that said mobile device is located at a discernible altitude level based, at least in part, on: (i) said at least one signal obtained from said at least one sensor onboard said mobile device; (ii) said electronic map indicative of said local terrain; (iii) an estimated movement routine corresponding to said mobile device or (iv) said at least one wireless signal acquired from at least one transmitting device, or (v) a combination thereof; and
means for initiating a calibration process of a barometer onboard said mobile device in response to a determination that said mobile device is located in said outdoor environment, has said level trajectory and is in motion at said discernible altitude level, said calibration process to identify a reference atmospheric pressure for said discernible altitude level.

10. The apparatus as recited in claim 9, wherein said means for determining that said mobile device is located at said discernable altitude level further comprises:
means for applying said electronic map indicative of said local terrain to said estimated horizontal location to determine an estimated altitude of said mobile device.

11. The apparatus as recited in claim 10, wherein said means for determining that said mobile device is located at said discernable altitude level further comprises:
means for estimating an error in said estimated altitude; and
means for determining said discernable altitude level as said estimated altitude if said estimated error is less than a threshold value.

12. The apparatus as recited in claim 9, wherein said means for determining that said mobile device is located at said discernable altitude level further comprises: means for determining that said mobile device is in motion at said discernible altitude level, based, at least in part, on a change in said at least one wireless signal acquired from said at least one transmitting device.

13. The apparatus as recited in claim 9, and further comprising: means for maintaining a calibration history corresponding to a plurality of completed calibration operations, said calibration history being indicative of at least a plurality of estimated discernible altitude levels, times of said completed calibration operations or corresponding identified reference atmospheric pressures, or any combination thereof, wherein determining that said mobile device is located at said discernible altitude level is further based, at least in part, on said calibration history.

14. A mobile device comprising:
a plurality of sensors, wherein at least one of said plurality of sensors comprises a barometer;
memory; and
a processing unit to:
determine that said mobile device is located in an outdoor environment based, at least in part, on (i) a history of detected movements of said mobile device; (ii) at least one signal obtained by at least one sensor onboard said mobile device; (iii) at least one signal acquired from at least one transmitting device; (iv) an electronic map indicative of local terrain or (v) an almanac indicative of horizontal locations and displacement of structures, or (vi) a combination thereof;
determine that said mobile device has a level trajectory based, at least in part, on (i) at least one signal obtained by one of said plurality of sensors of said mobile device; (ii) an estimated velocity of said mobile device or (iii) an estimated mode of transportation of a person holding said mobile device, or (iv) a combination thereof;
determine that said mobile device is located at a discernible altitude level based, at least in part, on: (i) said at least one signal obtained from one of said plurality of sensors; (ii) said electronic map stored in said memory and which is indicative of said local terrain; (iii) an estimated movement routing corresponding to said mobile device or (iv) said at least one signal acquired from at least one transmitting device, or (v) a combination thereof; and in response to a determination that said mobile device is located in said outdoor environment, has said level trajectory and is in motion at said discernible altitude level, initiate a calibration process of said barometer, to identify a reference atmospheric pressure for said discernible altitude level.

15. The mobile device as recited in claim 14, said processing unit to further:

apply said electronic map indicative of said local terrain to said estimated horizontal location to determine an estimated altitude of said mobile device.

16. The mobile device as recited in claim 15, said processing unit to further: determine that said mobile device is located at said discernable altitude level based, at least in part, on an estimated error in said estimated altitude being less than a threshold value.

17. The mobile device as recited in claim 14, and further comprising:

a receiver; and said processing unit to further: determine that said mobile device is located at said discernible altitude level, based, at least in part, on a change in said at least one wireless signal acquired from said at least one transmitting device via said receiver.

18. The mobile device as recited in claim 14, said processing unit to further: identify: (1) an altitude uncertainty value corresponding to said discernible altitude level; (2) a reference pressure uncertainty value corresponding to said reference atmospheric pressure; or (3) both (1) and (2).

19. The mobile device as recited in claim 14, said processing unit to further: maintain a calibration history corresponding to a plurality of completed calibration operations in said memory, said calibration history being indicative of at least a plurality of estimated discernible altitude levels, times of said completed calibration operations or corresponding identified reference atmospheric pressures, or any combination thereof, wherein determining that said mobile device is located at said discernible altitude level is further based, at least in part, on said calibration history.

20. A non-transitory computer readable medium having stored therein computer implementable instructions executable by a processing unit of a mobile:

determine that said mobile device is located in an outdoor environment based, at least in part, on (i) a history of detected movements of said mobile device; (ii) at least one signal obtained by at least one sensor onboard said mobile device; (iii) at least one signal acquired from at least one transmitting device; (iv) an electronic map indicative of local terrain or (v) an almanac of horizontal locations and displacement of structures, or (vi) a combination thereof;

determine that said mobile device has a level trajectory based, at least in part, on (i) at least one signal obtained by at least one sensor onboard said mobile device; (ii) an estimated velocity of said mobile device or (iii) an estimated mode of transportation of a person holding said mobile device, or (iv) a combination thereof;

determine that said mobile device is located at a discernible altitude level based, at least in part, on: (i) said at least one signal obtained from said at least one sensor onboard said mobile device; (ii) said electronic map indicative of said local terrain; (iii) an estimated movement routine corresponding to said mobile device or (iv) said at least one wireless signal acquired from at least one transmitting device, or (v) a combination thereof; and initiate a calibration process of a barometer onboard said mobile device in response to a determination that said mobile device is located in said outdoor environment, has said level trajectory and is in motion at said discernible altitude level, said calibration process to identify a reference atmospheric pressure for said discernible altitude level.

21. The non-transitory computer readable medium as recited in claim 20, said computer implementable instructions being further executable by said processing unit of said mobile device to:

apply said electronic map indicative of said local terrain to said estimated horizontal location to determine an estimated altitude of said mobile device.

22. The non-transitory computer readable medium as recited in claim 21, said computer implementable instructions being further executable by said processing unit of said mobile device to:

determine an estimated error in said estimated altitude; and determine said discernable altitude level as said estimated altitude if said estimated error is less than a threshold value.

23. The non-transitory computer readable medium as recited in claim 20, said computer implementable instructions being further executable by said processing unit of said mobile device to: determine that said mobile device is located at said discernible altitude level, based, at least in part, on a change in at least one wireless signal acquired from at least one transmitting device.

24. The non-transitory computer readable medium as recited in claim 20, said computer implementable instructions being further executable by said processing unit of said mobile device to: maintain a calibration history corresponding to a plurality of completed calibration operations, said calibration history being indicative of at least a plurality of estimated discernible altitude levels, times of said completed calibration operations or corresponding identified reference atmospheric pressures, or any combination thereof; and determine that said mobile device is located at said discernible altitude level further based, at least in part, on said calibration history.

* * * * *